United States Patent [19]
Garey et al.

[11] Patent Number: 5,983,340
[45] Date of Patent: *Nov. 9, 1999

[54] MICROPROCESSOR SYSTEM WITH FLEXIBLE INSTRUCTION CONTROLLED BY PRIOR INSTRUCTION

[75] Inventors: Kenneth E. Garey, Irvine; Mark E. Miller, Mission Viejo, both of Calif.

[73] Assignee: Conexant Systems, Inc., Newport Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/568,714

[22] Filed: Dec. 7, 1995

[51] Int. Cl.⁶ .................................. G06F 9/30; G06F 9/38
[52] U.S. Cl. .......................... 712/200; 712/209; 712/210; 712/218; 712/245; 712/32; 712/42
[58] Field of Search ..................................... 395/500, 800, 395/591, 733, 748, 726, 376, 384–387, 390–394, 595–598, 800.07–800.09, 800.16, 800.32, 800.41–800.42; 364/740, 747, 748, 736.04, 736.05; 712/7–9, 16, 32, 41–42, 200, 208–211, 214–218, 245

[56] References Cited

U.S. PATENT DOCUMENTS

| | | | |
|---|---|---|---|
| 4,782,441 | 11/1988 | Inagami et al. | 395/800.09 |
| 5,185,872 | 2/1993 | Arnold et al. | 395/393 |
| 5,488,728 | 1/1996 | Dreyer | 710/200 |
| 5,504,912 | 4/1996 | Morinaga et al. | 395/800.34 |
| 5,559,977 | 9/1996 | Avron et al. | 395/591 |
| 5,574,927 | 11/1996 | Scantlin | 712/200 |
| 5,579,527 | 11/1996 | Chin et al. | 395/800.16 |
| 5,598,546 | 1/1997 | Blomgren | 395/385 |
| 5,619,668 | 4/1997 | Zaidi | 395/376 |

*Primary Examiner*—Zarni Maung
*Assistant Examiner*—Bharat Barot
*Attorney, Agent, or Firm*—Snell & Wilmer L.L.P.

[57] ABSTRACT

A data processing apparatus having a pipeline computer architecture with an input pipeline latch is disclosed. The data processing apparatus includes an ALU that executes a plurality of processing instructions. At least some of the instructions have an immediate data format including a field for intermediate data and a field for specifying a destination for an output. The ALU uses two operands for performing at least some of the instructions having the immediate data format. The ALU conditionally accepts either the contents of the input pipeline latch or the ALU output of the previous instruction as a second operand to an immediate instruction depending on the destination specified in the destination field of the previous instruction.

4 Claims, 4 Drawing Sheets

MICROPROCESSOR SYSTEM WITH FLEXIBLE INSTRUCTION CONTROLLED BY PRIOR INSTRUCTION

BACKGROUND

1. Field of the Invention

The present invention is directed to a pipelined processor. Specifically, the present invention is directed to a pipelined processor having sequential processing instructions wherein at least some of the processing instructions conditionally use an operand.

2. Prior Art

A typical processor architecture may include a series of processing instructions where an instruction having an immediate data format can use one or more operands. Because immediate instructions can not specify all the operands they need, they use implied operands that are typically the result of the prior instruction. The typical implied operands are an "accumulator," a register usually located in the arithmetic unit of a processor, or a "top of stack," the last memory location used in a last in first out data memory mechanisms. In addition to an accumulator or top of stack a pipeline architecture has several pipeline latches or bus states that may contain useful data that could also be used as an implied operand.

Restricting an immediate instruction's second operand to be the outputs of the previous instruction or data supplied by a single pipeline latch limits the functionality of the immediate instruction in the processor. It is therefore an object of the present invention to provide a pipelined processor enhanced functionality through an expanded availability of operands that can be received by an immediate instruction.

SUMMARY

One object of an embodiment of the present invention is to provide a pipelined processor enhanced functionality by expanding the availability of second input operands that an immediate instruction can receive.

It is another object of an embodiment of the present invention to provide a pipelined processor where the immediate instruction may utilize either the output of a previous instruction or data stored in a pipeline latch as an operand based upon the execution of the prior instruction.

Briefly, an embodiment of the present invention is directed to a data processing apparatus having a pipelined computer architecture. The pipelined computer architecture performs a plurality of sequential processing instructions. Each processing instruction provides an output that is written to a destination in a register or a memory defined by a destination address. An immediate instruction uses the output generated by the prior instruction as a second operand. An immediate instruction may use based upon the destination operand selected by the previous instruction, either an input operand of that previous instruction or the output of the previous instruction as a second operand.

DETAILED DESCRIPTION

Figure 1:
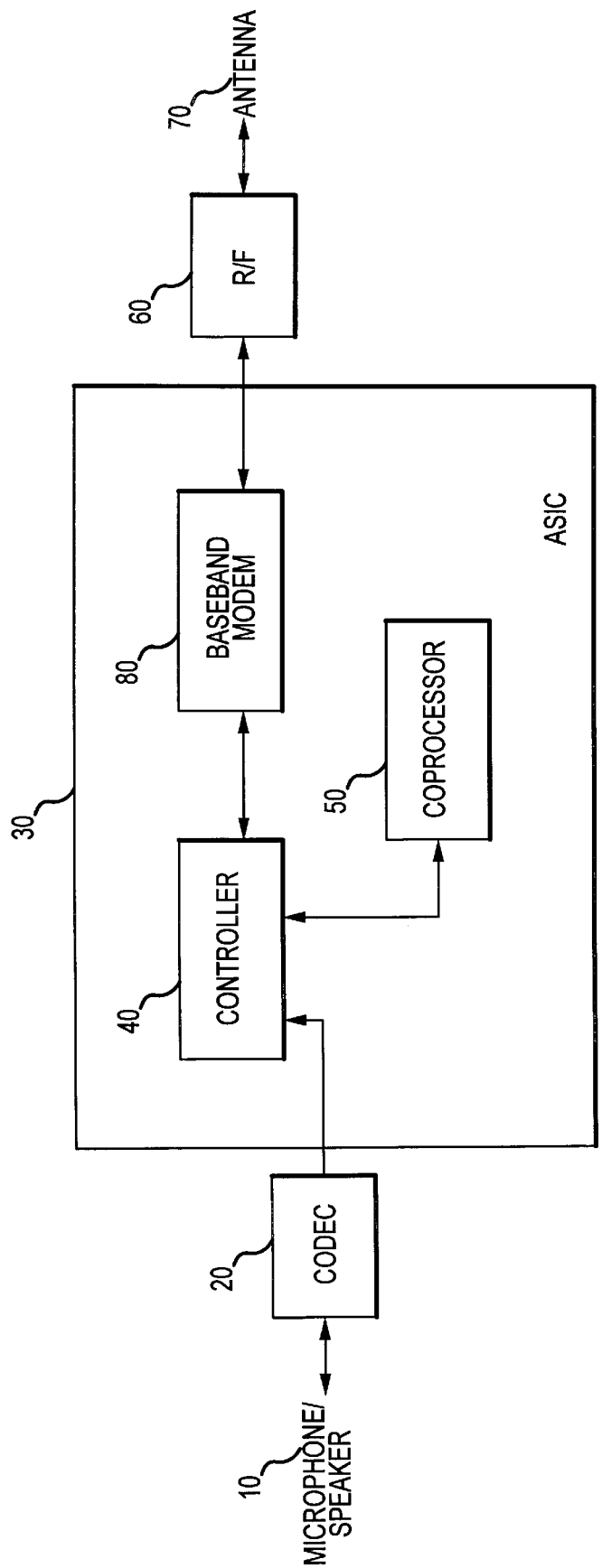
FIG. 1 shows a block diagram of a system within which an embodiment of the present invention operates.

FIG. 1 shows a block diagram of a system within which an embodiment of the present invention operates. Such a system may be within a hand held digital cordless phone or some other radio frequency device for receiving and transmitting signals having real-time processing requirements and requirements for low power, light weight and small volume. In a preferred embodiment, a controller 40, a coprocessor 50, and a baseband modem 80 are incorporated in a single application specific integrated circuit (ASIC) 30. The controller 40 may be a general purpose processor such as the 6502 processor. The coprocessor 50 is preferably a specialized processor for performing repetitive operations at high speed. The baseband modem 80 provides spread spectrum modulation.

In transmitting, the microphone/speaker 10 provides audio signals to a codec 20. The codec 20 digitally samples the audio signals and provides digital data to the ASIC 30 for processing according to algorithms stored in the ASIC 30. The controller 40 commands the coprocessor 50 to process the sampled data provided by the codec 20 using digital signal processing operations. These signal processing operations may include speech data compression using adaptive differential pulse code modulation such as those set forth in the CCITT G721 standard. Once processed, the resultant data is provided to the controller for supplying encoded data to the baseband modem 80, which provides a modulation signal to the R/F unit 60 to be converted into a signal in the 900 megahertz frequency band and then amplified and transmitted over the antenna 70.

In receiving, the R/F unit 60 amplifies and converts to the baseband frequency the signals received from the antenna 70 to provide to the baseband modem 80 a signal which it demodulates into digital data which is passed to the controller 40. The received data is provided to the coprocessor 50 where it is decoded. The decoded digital data is then passed to the codec 20 through the controller 40. The codec 20 converts the decoded digital data into an amplified analog signal that is provided to microphone/speaker 10.

Figure 2:
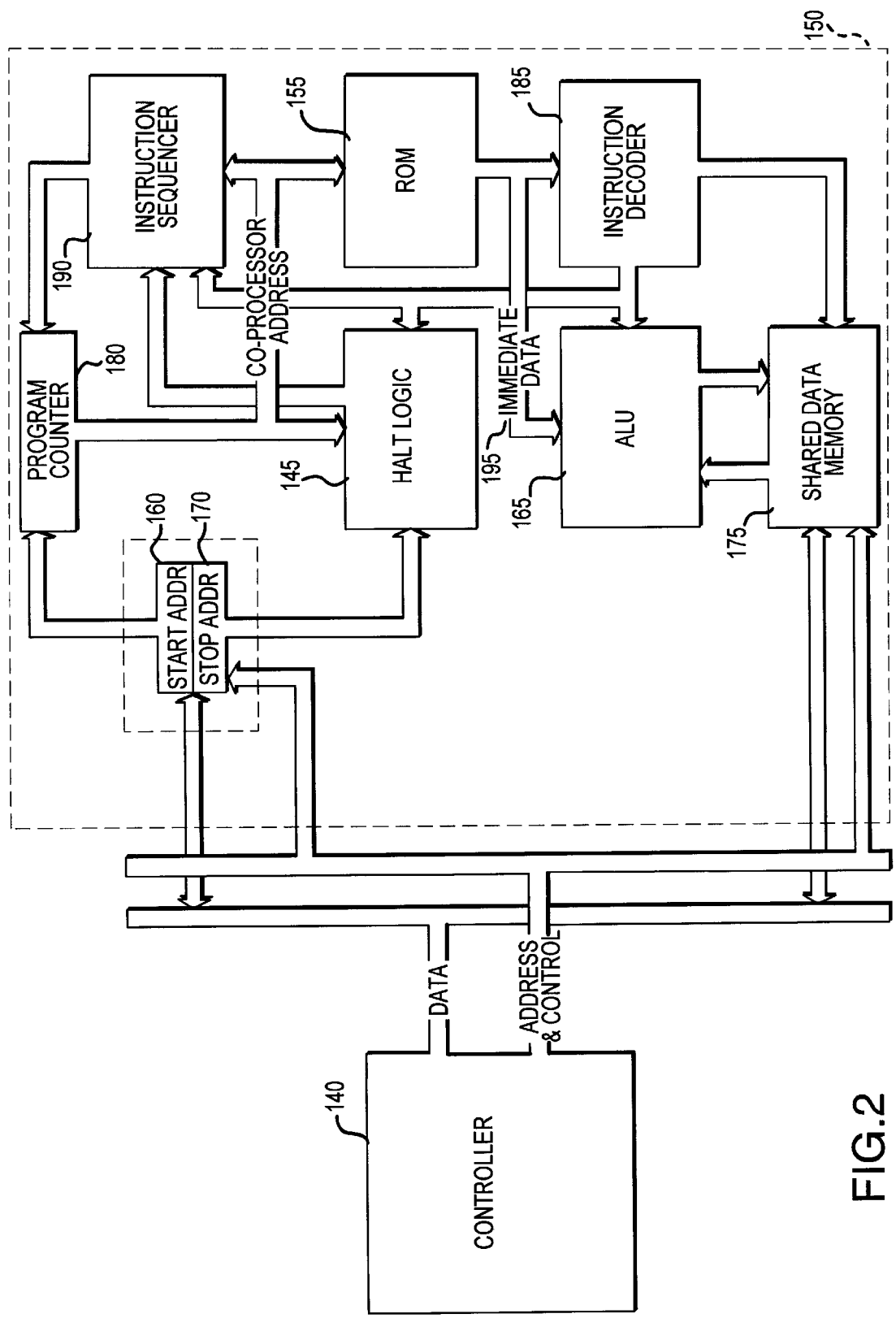
FIG. 2 shows a block diagram describing the interaction between the controller and the coprocessor of a preferred embodiment.

FIG. 2 shows a block diagram describing how the controller 140 controls the execution of the coprocessor 150. The start address from the start address register 160 is moved to the program counter 180 to indicate the location of the first instruction to be performed in a procedure commanded by the controller 140. After each instruction is performed, the program counter 180 increments. The stop address from the stop address register 170 is provided to halt logic 145 so that processing halts when the program counter 180 reaches stop address 170.

In a preferred embodiment, the ROM 155 provides instructions and immediate data to the decoder 185 and the ALU 165 over the Immediate Data bus 195. This embodiment may implement a three stage pipelined processor. In such a three stage processor, at any particular cycle a first instruction is being executed in the ALU 165 using data from the Shared Data Memory 175 or the immediate data supplied by the ROM 155 over the Immediate Data bus 195, while a second instruction, which is expected to be executed immediately following the execution of the first instruction, is being decoded in the instruction decoder 185 and a third instruction, which is expected to be executed immediately following the execution of the second instruction, is being fetched from ROM 155 according to the program counter 180.

Figure 3A:
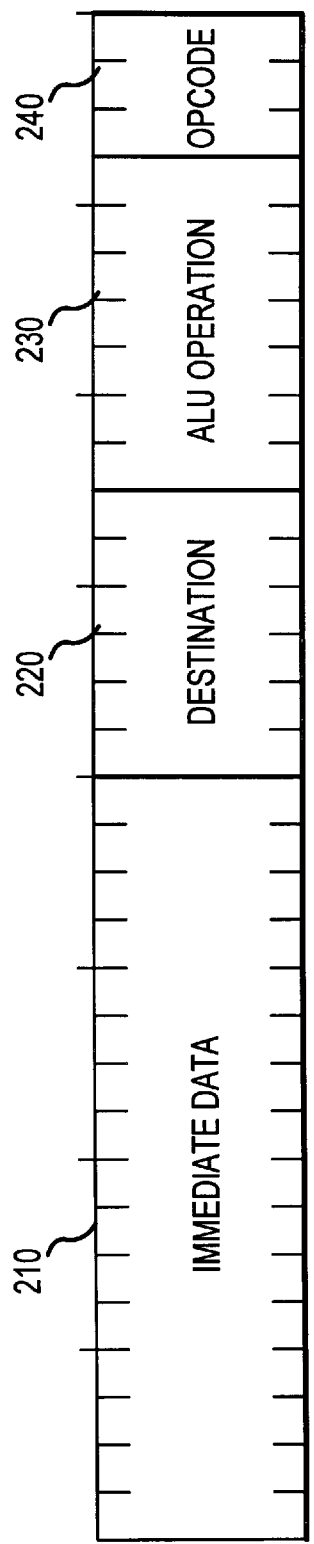
FIG. 3a shows a two-operand immediate instruction format in an embodiment having thirty two bit instructions.
Figure 3B:
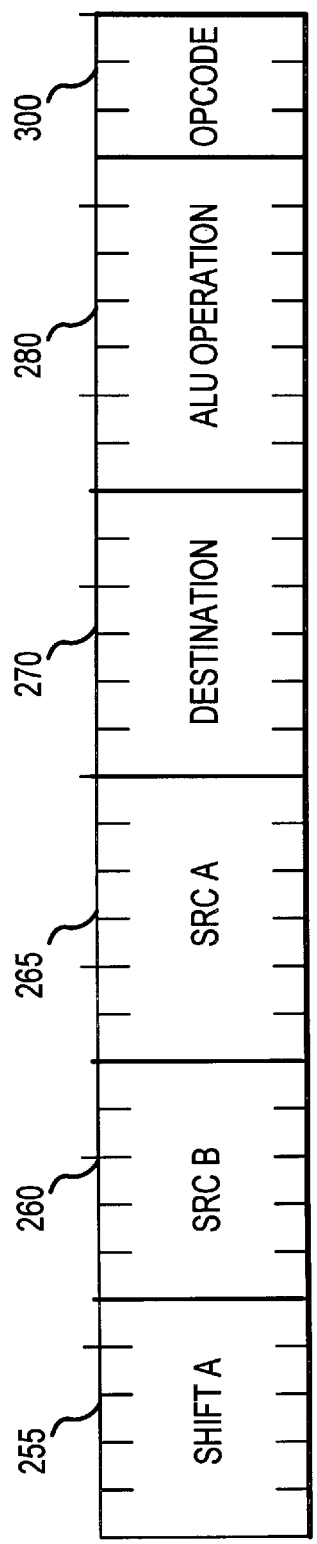
FIG. 3b shows a three-operand immediate instruction format in an embodiment having thirty two bit instructions.

In one embodiment, as shown in FIGS. 3a and 3b the coprocessor may utilize thirty two bit instructions and can have at least two types of instruction formats, a two-operand immediate instruction format and a three-operand instruction format. FIG. 3a shows the immediate instruction format 200 which includes sixteen bits for an immediate data field 210, a six bit destination field for specifying the address of the destination of the output 220, a seven bit field for specifying an ALU function in ALU operation field 230 and three bits for specifying an opcode in opcode field 240. The opcode in opcode field 240 preferably identifies the type of instruction format, among other things.

The three-operand instruction format 250 shown in FIG. 3b differs from the immediate instruction format 200 in that two input operands are specified in the fields 260 and 265. A shift field 255 preferably specifies the number of bits to shift the "A" input operand.

With the immediate instruction format 200, on the other hand, the sixteen bits in the immediate data field 210 specify only one operand. Some immediate data format instructions require only one input operand. Other immediate data instructions may require a second input operand. For executing immediate data format instructions requiring a second operand, the ALU uses an implied second operand based upon the nature of the instruction. For example, an immediate data instruction for addition requires an implied second operand. The opcode shown in field 240 of the immediate data instruction format 200 shown in FIG. 3a along with the specified instruction in the ALU operation field 230 are used by the ALU logic for determining whether an implied second operand is needed in performing the instruction.

In one embodiment, the implied second input operand in the immediate instruction format is either the result of performing a previous instruction or the data stored in a pipelined latch. In particular, the instruction sequencer 190 in performing an immediate instruction has the available for use of the state the ALU output bus immediately following the execution of the previous instruction such as that which may be stored in a destination latch (not shown). Depending on the destination specified in the destination field 220 or 270 of the prior instruction, the instruction decoder means such as an instruction sequencer or decoder in performing the immediate instruction either loads the output bus state of the previous instruction into the ALU B-input pipeline latch or preserves the contents of the pipelined input latch. In effect, when the instruction sequencer does not load the output bus state of the previous instruction into the ALU B-input pipeline latch and preserves the contents of the ALU B-input pipeline latch, the instruction sequencer may use the data already stored in the pipeline latch as the second operand again in the current or a later instruction.

There is also one destination specified by the destination field that specifies that the ALU result is not to be written to any destination (e.g. "Noplace"). When an instruction specifies that destination, the instruction sequencer preferably uses the state of the ALU output bus as the implied second operand for an immediate instruction.

In an embodiment, for some immediate data format instructions requiring first and second operands, the ALU passes either the first operand or the second operand to the destination specified in the current instruction. In particular, the ALU passes to the destination of the current instruction either the immediate data or the implied second operand, the contents of the ALU B-input latch for example, based upon the output bus state following the execution of the previous instruction. The ALU may also select which value to load to the destination based upon ALU status bits set as a result of the execution of the previous instruction such as an ALU a sign out flag, a carry in flag, or an ALU zero out flag.

Figure 4:
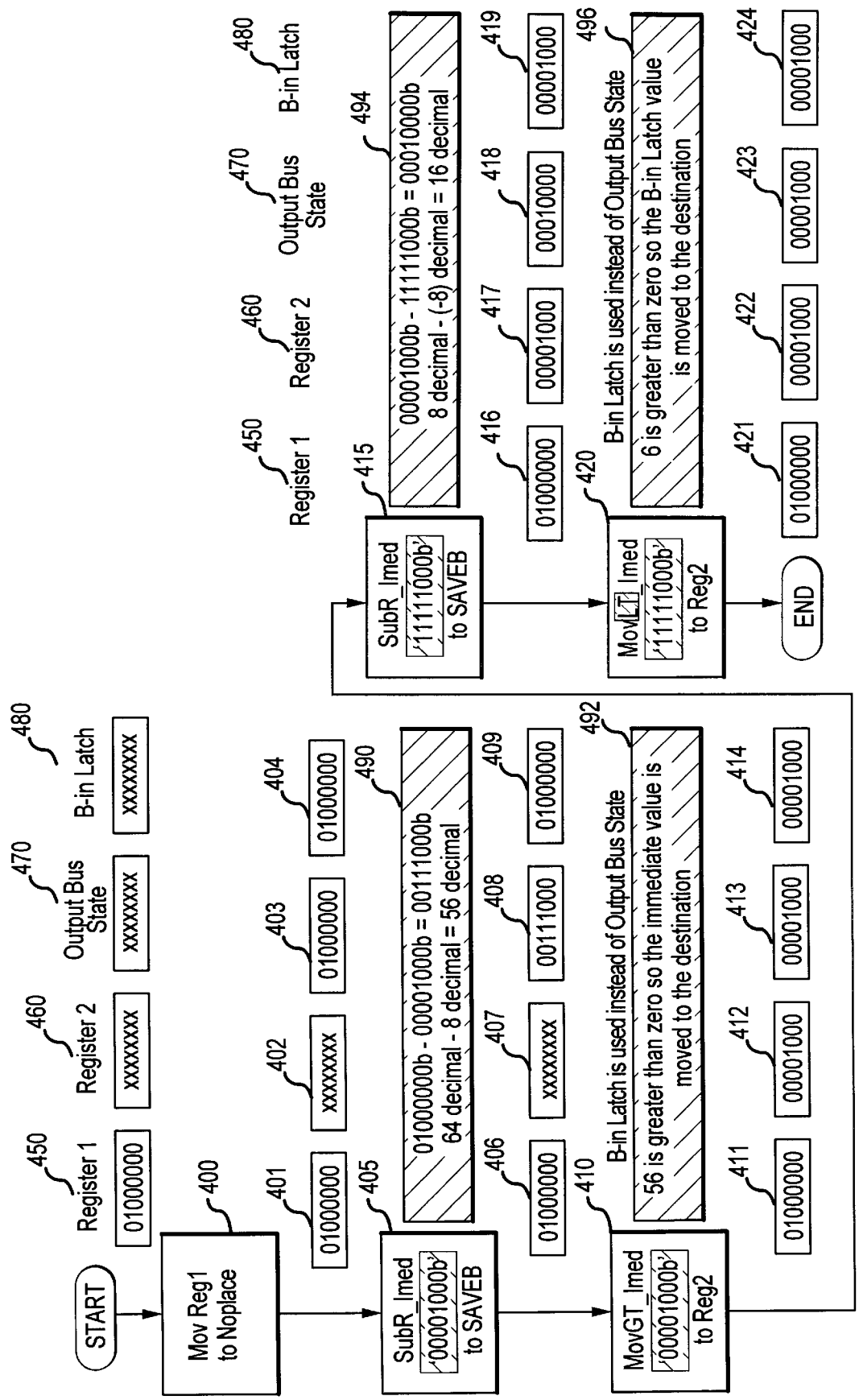
FIG. 4 shows a specific application of an embodiment for performing a clipping operation.

FIG. 4 illustrates a specific application of an embodiment for performing a clipping operation. However, it is understood that this embodiment can implement other procedures employing level testing operations on the amplitudes of digitally sampled signals. FIG. 4 shows this particular clipping operation for an eight bit word. However, it is understood that this clipping operation may also be performed for words of other sizes. In the clipping operation of FIG. 4, input values are clipped to be between 1111000b and 00001000b (−8 and 8 base ten). If the input value exceeds 00001000b, the ALU forces the output to be 00001000b. If the input value is between 11111000b and 00001000b, the ALU returns the input value as the output value. If the input value is less than 11111000b, the ALU forces the output value to be 11111000b.

Steps 400 represent an instruction having 3-operand format 250 while steps 405, 410, 415 and 420 represent instructions having the immediate instruction format 200 as shown in FIG. 3b and 3a, respectively, for performing the clipping operation. The values shown in quotations in each of the steps represent the binary immediate data of the instruction corresponding to the step such as "00001000b" in step 405. Columns 450 and 460 show values of first and second general purpose registers, Registers 1 and 2, before and after each instruction performed by the ALU. Column 470 shows the state of an output bus, reflecting the output of the ALU after performing the previous instruction and before performing the next instruction. Alternatively, the output of the ALU can be loaded to a destination latch. Column 480 labeled "B-in Latch" shows the contents of the ALU B-input latch which is a pipeline latch. Thus, the values shown in the four boxes disposed between each step represent the contents of the respective registers, output bus state and contents of the ALU B-input latch, where "X" represents an indeterminate value. The shaded boxes 490, 492, 494 and 496 show the actual calculation being performed.

It should be noted that the output bus state is not always loaded into the ALU the B-input latch. Whether the output bus state of a previous instruction is loaded into the ALU B-input latch depends on the destination specified in the destination field of the previous instruction and the SRC B field of the current instruction when it is a three-operand instruction.

The instructions shown in FIG. 4 designate "Noplace," "SAVEB," "Reg1" (Register 1) and "Reg2" (Register 2) as destinations (memory locations) for the results from performing the instructions corresponding to the destination fields shown in FIGS. 3a and 3b. The destinations "SAVEB" and "Reg2" as used in instruction steps 405, 410, 415 and 420 correspond to the destination field 220 of the immediate instruction format shown in FIG. 3a. Where an instruction has the destination "SAVEB", the contents of the B-in latch are preserved to be used by the following instruction.

At step 400, the contents of Register 1, which is the input value for this clipping operation "01000000b", is both loaded into B-in latch at 404 and becomes the output bus state at 403. However, it is understood that "01000000b" can loaded into the B-in latch by other methods. Step 400 merely illustrates initialization.

At step 405, the ALU performs the instruction "SubR_Imed '00001000b' to SAVEB" to subtract the immediate data, "00001000b", from the output state "01000000b" shown at 403. Since the instruction at step 400 does not specify "SAVEB" as the destination, the output bus state resulting from the previous instruction at 403 ("01000000b") is also loaded to the B-in latch at 404. Performing the instruction at step 405 changes the state of the output bus to reflect the value shown at 408 to "00111000b". As "01000000b", the input value, exceeds "00001000b", the positive limit of the clipping operation, a positive value results from performing this instruction.

At step 410 since the instruction at step 405 specifies "SAVEB" as the destination ("01000000b") the previous B-in latch value is preserved at 409. Step 410, the instruction "MovGT_Imed '00001000b' to Reg2" loads either the immediate data ("00001000b") to Reg2 or the value stored in the B-in latch, depending on the sign of the state of the output bus at 408. Since the sign of the state of the output bus at 408 is positive, the ALU when performing this instruction loads the immediate data (which is the maximum "clipped" output value) into Reg2 at 412 and changes the state of the output bus at 413 to be the immediate data.

At step 415, the ALU performs instruction "SubR_Imed '11111000b' to SAVEB" to subtract the immediate data, which is the negative limit of the clipping operation ("11111000b"). Since the instruction at step 410 does not specify "SAVEB" as the destination, the output bus state resulting from the previous instruction at 413 ("00001000b") is also loaded to the B-in latch at 414. The output bus state is changed to reflect the result of this instruction ("00010000b") as shown at 418.

At step 420, since the instruction at step 455 specifies "SAVEB" as the destination, ("00001000b") the previous B-in latch value is preserved at 419. Step 420, the instruction "MovLT_Imed '11111000b' to Reg2" loads either the immediate data "11111000b" or the contents of the B-in latch depending on the sign of the output bus state at 418 resulting from the previous instruction. This instruction clips the output of the instruction at step 410 to the negative limit of the clipping operation if the input initialized at step 400 is less than the negative limit. Since the sign of the output bus state at 418 ("00010000b") is positive, this instruction does not change the state of the output bus according to the immediate data "11111000b". Hence, the output of the instruction at step 410 is not clipped to the negative limit as the input data at step 400 is greater than that lower clipping limit. The contents of Reg2 are preserved from 417 to 422 and the output bus state is changed to be the contents of Reg2.

As illustrated above, the pipelined processor includes an instruction sequencer that performs immediate data format instructions that may require a second operand. The instruction sequencer may select either the contents of the ALU B-input pipeline latch or the output bus state resulting from the previous instruction as the second operand of the current instruction depending on the destination specified in the destination field of the previous instruction. Additionally, in executing some of the immediate data format instructions having implied second operands, the ALU loads to the destination and the output bus either the immediate data of the current instruction or the contents of the pipelined latch depending on the ALU status of the previous instruction. Accordingly, the instruction sequencer is afforded greater flexibility in the selection of a second operand for an immediate data format instruction.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A processor having memory means for storing a plurality of data and for performing arithmetic and logical operations based upon a defined set of instructions which specify the processor function required to provide results at an output based on operands, said processor comprising:

an ALU;

an instruction decoder means for controlling the ALU in response to a sequence of instructions that are sequentially provided to the instruction decoder including a first instruction, a second subsequent instruction other than the first instruction, and a third subsequent instruction other than the first and second instruction;

a plurality of instruction fields within the first instruction including at least one instruction field that contains a particular control value related to an operation of the second subsequent instruction; and control logic that responds to the particular control value related to the second subsequent instruction and alters the operation of the second subsequent instruction in such a fashion that it generates a different result solely in response to the particular control value contained in the at least one instruction field of the first instruction, independent of all other operations of the first instruction, and without affecting the third instruction.

2. A processor as described in claim 1 wherein the at least one instruction field within the first instruction comprises a destination operand field.

3. A processor as described in claim 2 wherein the control logic uses the at least one destination operand field of the first instruction to alter the operation of the subsequent instruction by causing a second input operand of the subsequent instruction that ordinarily corresponds to a result of the first instruction to instead correspond to a second input operand of the first instruction.

4. The processor of claim 1 wherein the instruction decoder means detects a predetermined control value in an output destination field of a previous instruction.

* * * * *